(12) United States Patent
Roberts

(10) Patent No.: US 9,567,943 B2
(45) Date of Patent: Feb. 14, 2017

(54) PIVOTING TRACK LOCK

(71) Applicant: Rohr, Inc., Chula Vista, CA (US)

(72) Inventor: Stephen Michael Roberts, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 24 days.

(21) Appl. No.: 14/714,100

(22) Filed: May 15, 2015

(65) Prior Publication Data
US 2016/0333825 A1 Nov. 17, 2016

(51) Int. Cl.
*F02K 1/76* (2006.01)
*B64D 29/06* (2006.01)

(52) U.S. Cl.
CPC .............. *F02K 1/766* (2013.01); *B64D 29/06* (2013.01)

(58) Field of Classification Search
CPC ......... B64D 29/06; B64D 27/00; B64D 33/00; B64D 31/10; F02K 1/76; F02K 1/763; F02K 1/766
USPC ..................... 244/54, 53 R, 60, 62
See application file for complete search history.

(56) References Cited

U.S. PATENT DOCUMENTS

| | | | | |
|---|---|---|---|---|
| 4,613,099 A | * | 9/1986 | Smith | B64D 29/06 244/129.4 |
| 6,625,972 B1 | * | 9/2003 | Sternberger | F02K 1/76 239/265.29 |
| 8,567,712 B2 | * | 10/2013 | Porte | B64D 29/08 244/129.4 |
| 9,109,541 B2 | * | 8/2015 | Channel | F02K 1/72 |
| 2010/0264676 A1 | * | 10/2010 | Sternberger | B64C 13/00 292/302 |
| 2014/0270935 A1 | * | 9/2014 | Willett | F02K 1/766 403/375 |

FOREIGN PATENT DOCUMENTS

WO    WO2014/202918    * 12/2014

* cited by examiner

*Primary Examiner* — Christopher P Ellis
*Assistant Examiner* — Magdalena Topolski
(74) *Attorney, Agent, or Firm* — Snell & Wilmer L.L.P.

(57) ABSTRACT

The track lock assembly may comprise a translating sleeve, a track beam, a pivoting lock assembly, and a ramp. The pivoting lock assembly may be mounted to the translating sleeve, wherein in response to the pivoting lock being mounted to the translating sleeve, the ramp is mounted to the track beam. The pivoting lock assembly may be mounted to the track beam, wherein in response to the pivoting lock being mounted to the track beam, the ramp is mounted to the translating sleeve.

15 Claims, 10 Drawing Sheets

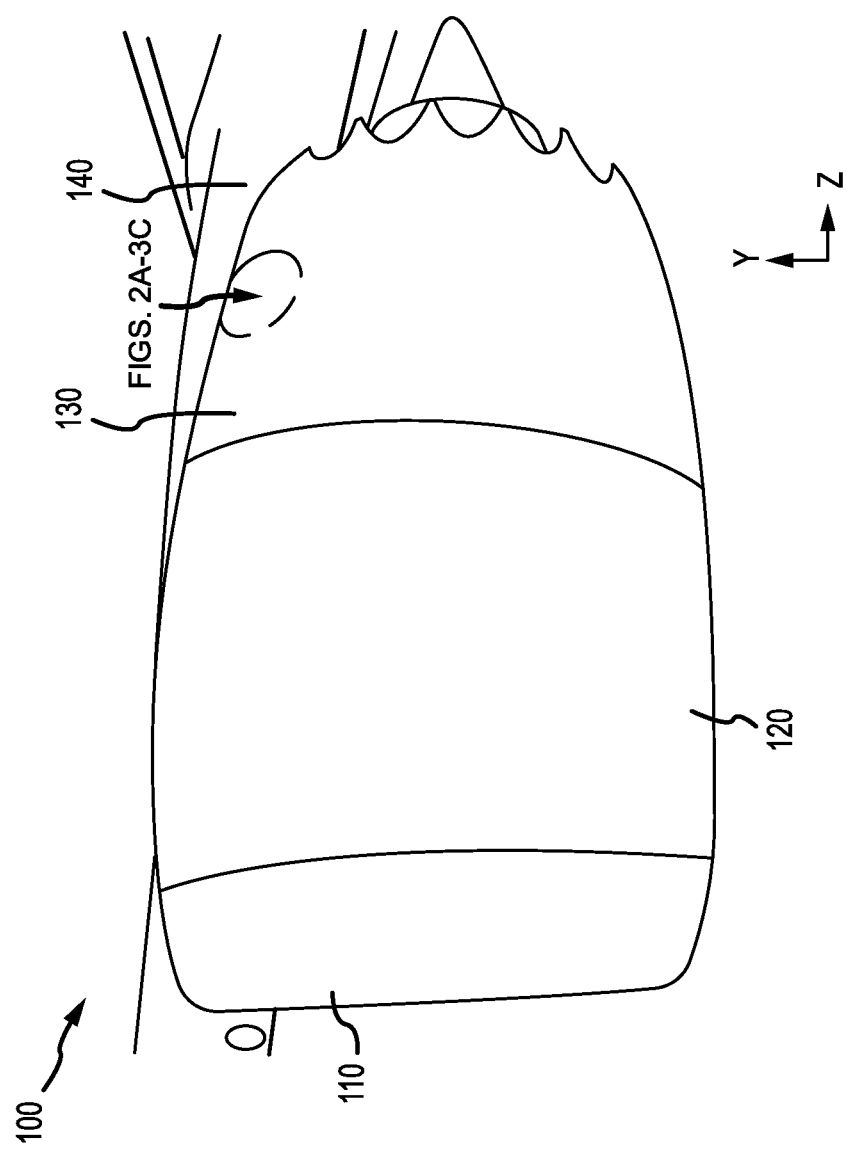

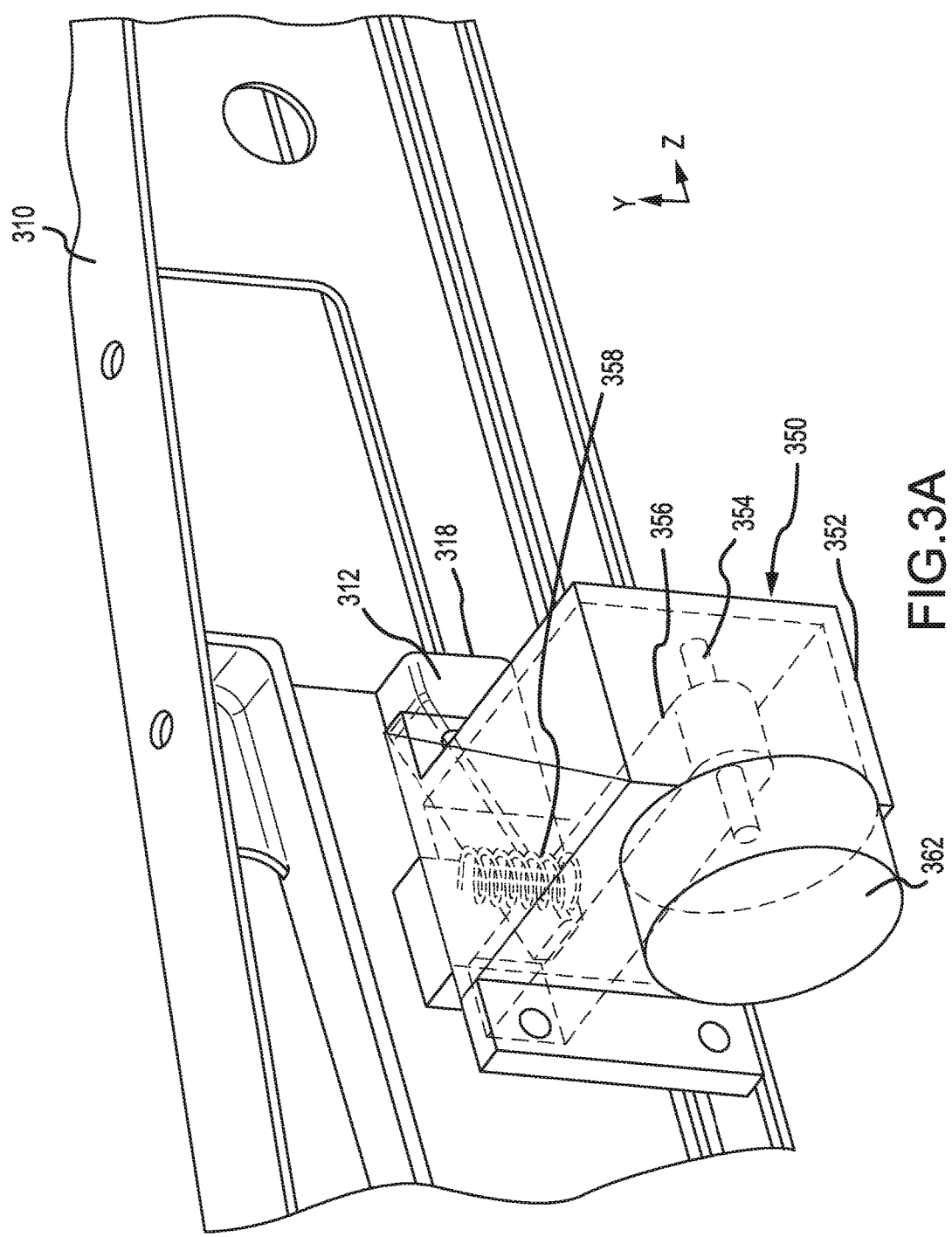

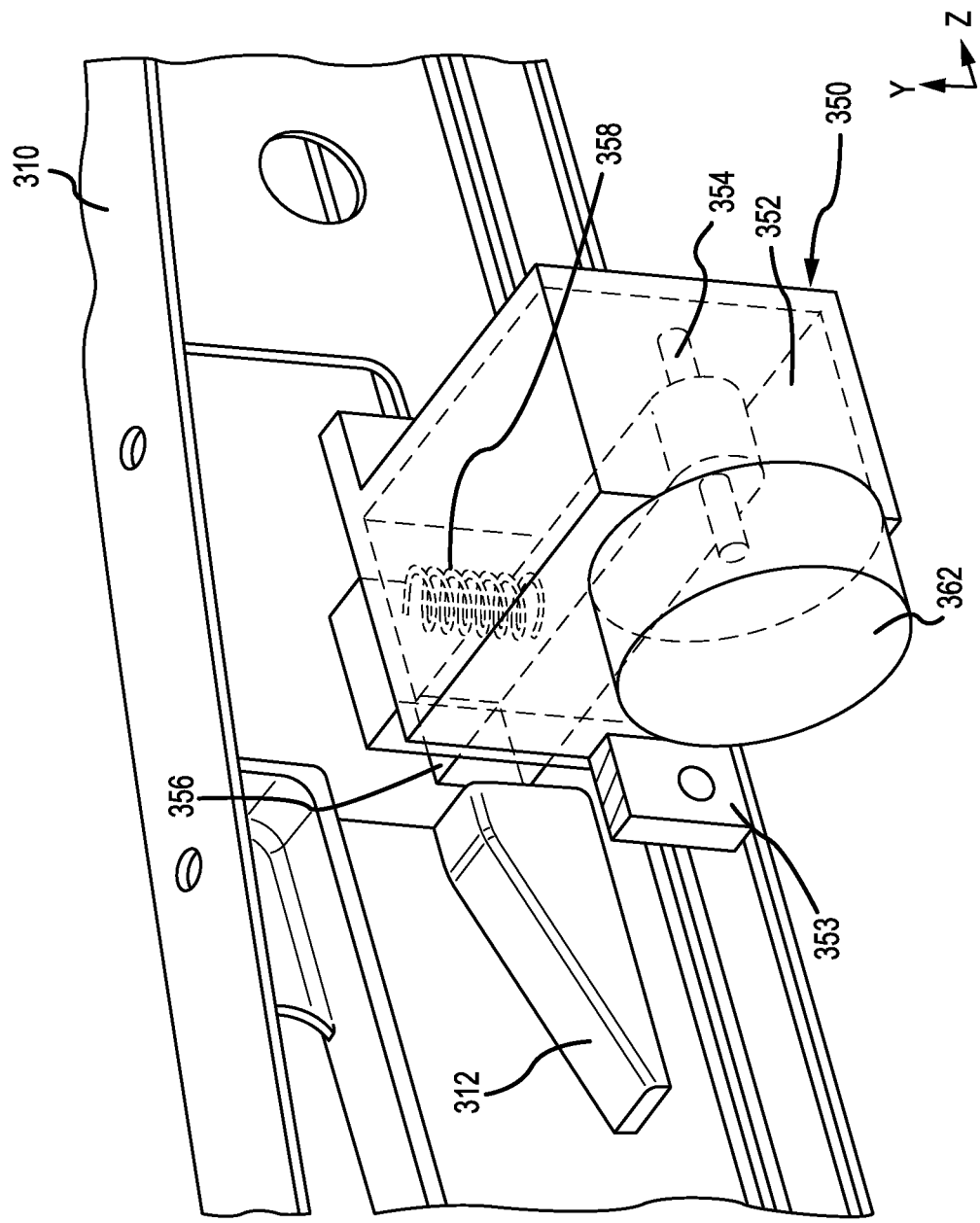

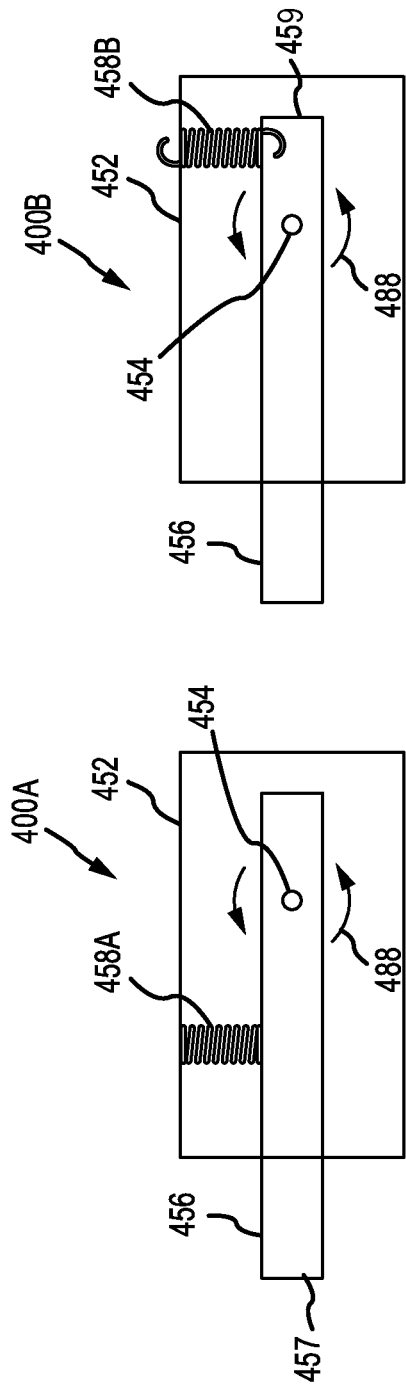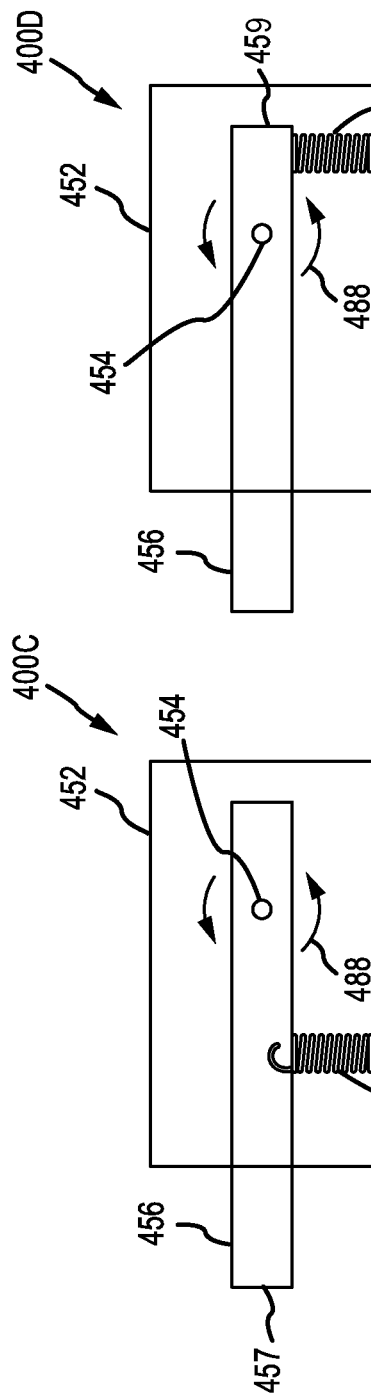

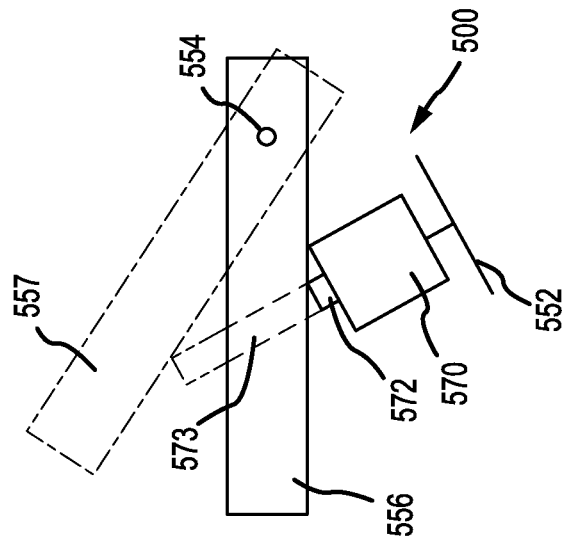
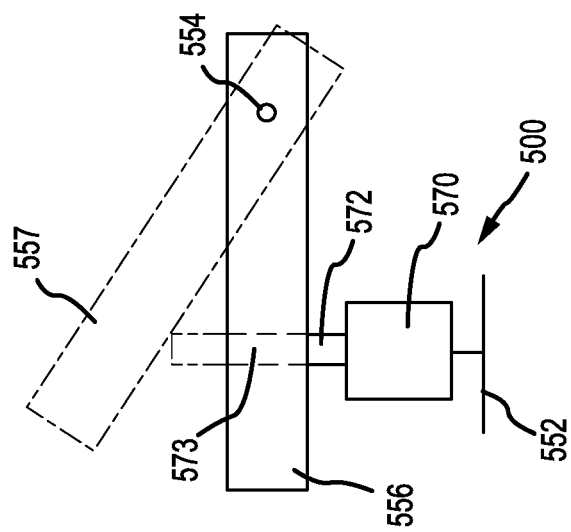

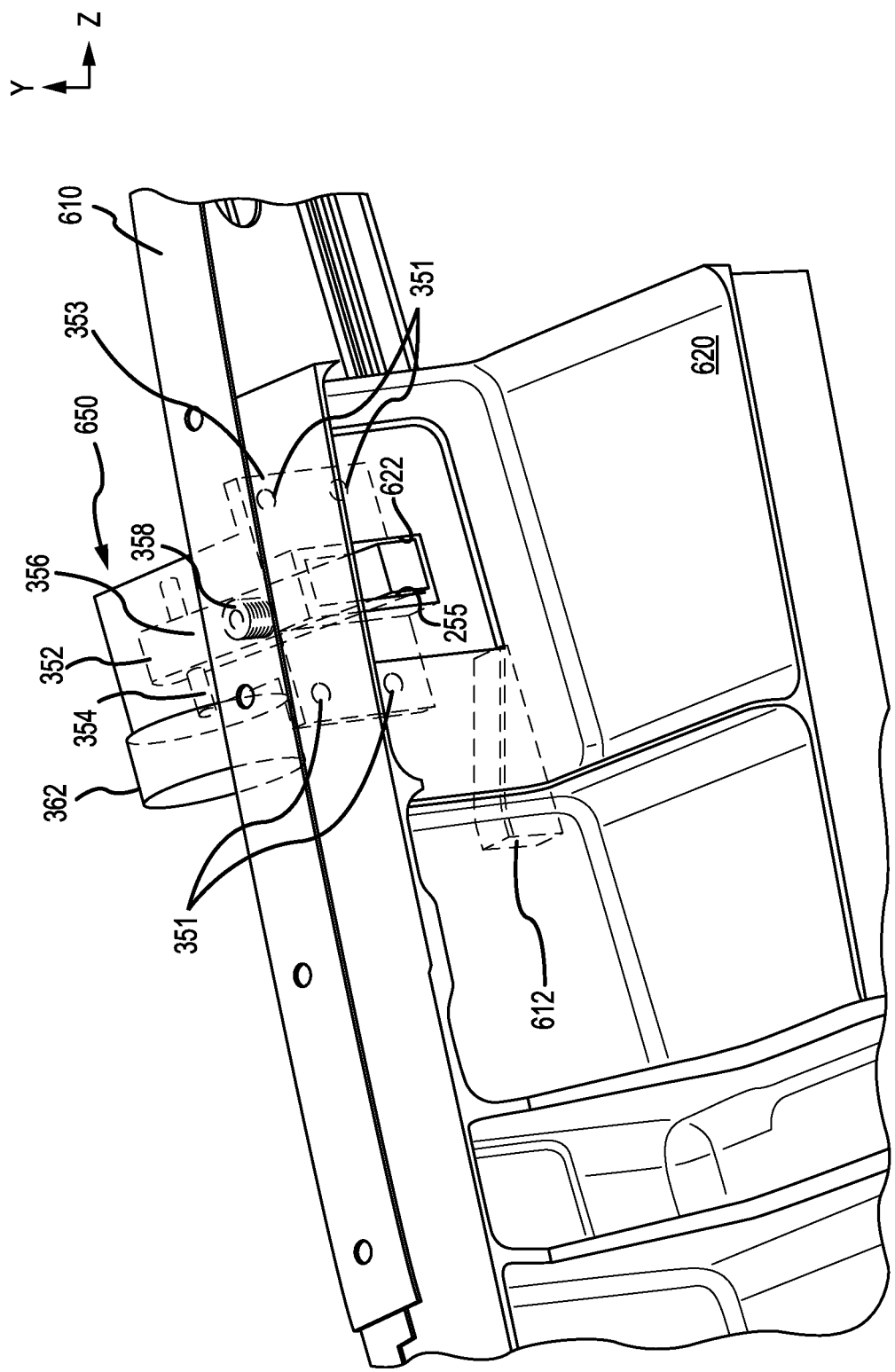

PIVOTING TRACK LOCK

FIELD

The present disclosure relates to turbine engine systems and, more specifically, to a track lock system for use with a turbine engine translating sleeve.

BACKGROUND

Turbine engine thrust reverser systems include a translating sleeve on which a thrust reverser can translate forward and aft. A track locking system (also referred to as a tertiary lock or a sleeve lock) prevents the translating sleeve from being accidentally deployed. Track lock systems can be bulky and may encroach upon other nearby engine components.

SUMMARY

A track lock assembly is described herein according to various embodiments. The track lock assembly may comprise a translating sleeve, a track beam, a pivoting lock assembly, and a ramp. In various embodiments, the lock assembly may be mounted to the translating sleeve, wherein in response to the lock assembly being mounted to the translating sleeve, the ramp is mounted to the track beam. In various embodiments, the lock assembly may be mounted to the track beam, wherein in response to the lock assembly being mounted to the track beam, the ramp is mounted to the translating sleeve. The track beam may be positioned adjacent to the translating sleeve, wherein the translating sleeve is mounted on the track beam for translating movement relative thereto. In various embodiments, the lock assembly may comprise a pivoting lock arm, the pivoting lock arm pivoting in a plane that is generally normal to the axis of translation of the translating sleeve. In various embodiments, the lock assembly may be configured to secure the translating sleeve against translation relative to the track beam when the pivoting lock arm is in a locked position, wherein the pivoting lock arm is configured to engage the ramp. In various embodiments, when the translating sleeve is deployed and moves toward its stowed position, the pivoting lock arm may be pivoted by the ramp until the lock arm clears the ramp.

A nacelle is described herein according to various embodiments. The nacelle may comprise a translating sleeve, a track beam, a pivoting lock assembly, and a ramp. In various embodiments, the lock assembly may be mounted to the translating sleeve, wherein in response to the lock assembly being mounted to the translating sleeve, the ramp is mounted to the track beam. In various embodiments, the lock assembly may be mounted to the track beam, wherein in response to the lock assembly being mounted to the track beam, the ramp is mounted to the translating sleeve. The track beam may be positioned adjacent to the translating sleeve, wherein the translating sleeve is mounted on the track beam for translating movement relative thereto. In various embodiments, the lock assembly may comprise a pivoting lock arm, the pivoting lock arm pivoting in a plane that is generally normal to the axis of translation of the translating sleeve. In various embodiments, the lock assembly may be configured to secure the translating sleeve against translation relative to the track beam when the pivoting lock arm is in a locked position, wherein the pivoting lock arm is configured to engage the ramp. In various embodiments, when the translating sleeve is deployed and moves toward its stowed position, the pivoting lock arm may be pivoted by the ramp until the lock arm clears the ramp.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 illustrates a side view of a nacelle in accordance with various embodiments;

FIG. 3A illustrates a perspective view of a pivoting track lock assembly with the translating sleeve in a deployed position in accordance with various embodiments;

FIG. 3C illustrates a perspective view of a pivoting track lock assembly with the translating sleeve in a stowed position in accordance with various embodiments;

FIG. 4A illustrates a side view of an exemplary coil spring location for a pivoting track lock assembly in accordance with various embodiments;

FIG. 4B illustrates a side view of an exemplary coil spring location for a pivoting track lock assembly in accordance with various embodiments;

FIG. 4C illustrates a side view of an exemplary coil spring location for a pivoting track lock assembly in accordance with various embodiments;

FIG. 4D illustrates a side view of an exemplary coil spring location for a pivoting track lock assembly in accordance with various embodiments;

FIG. 5A illustrates a side view of an exemplary pivoting track lock assembly with an actuator system normal to the bar in accordance with various embodiments;

FIG. 5B illustrates a side view of an exemplary pivoting track lock assembly with an actuator system at an angle to the bar in accordance with various embodiments;

FIG. 6A illustrates a proximal view of a hinge beam assembly with the translating sleeve in a deployed position in accordance with various embodiments.

DETAILED DESCRIPTION

Figure 2A:
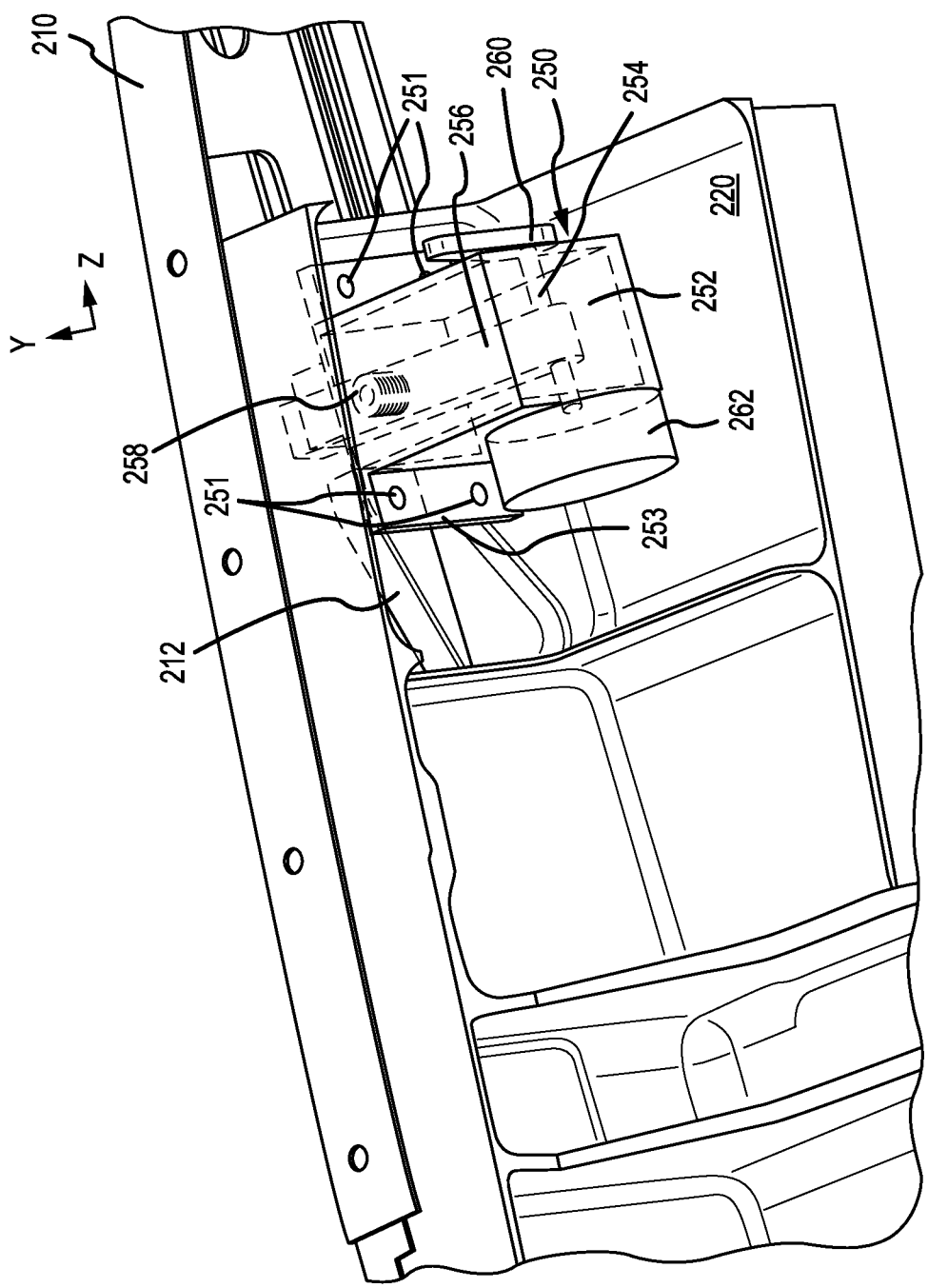
FIG. 2A illustrates a proximal view of a pivoting track lock assembly in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

In various embodiments, a thrust reverser may be configured to direct the flow of bypass air in a forward direction, causing reverse thrust. In this regard, a thrust reverser may comprise a translating sleeve which may be configured to translate forward and aft (e.g., to stow and deploy), in a known manner. The translating sleeve may be configured to translate forward and aft adjacent to at least one of a hinge beam (e.g., the upper track beam) and a latch beam (e.g., the lower track beam). Accordingly, a hinge beam and a latch beam may be referred to herein collectively as track beams and/or a track beam. Various lock systems may be used to prevent the translating sleeve from aft translation. Typically, a track lock, also known as a "third lock" or a "tertiary lock," is located between a track beam and a translating sleeve. These locks can be bulky and encroach on adjacent engine components. Accordingly, a more compact lock may be desirable.

While the lock systems described herein are described in the context of the hinge beam relative to the translating sleeve, one will appreciate that the systems described herein may be used in connection with various other track lock applications, including the latch beam relative to its adjacent translating sleeve, for example.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body.

Referring to FIG. 2A, a proximal view of a lock assembly mounted on a hinge beam is illustrated in accordance with various embodiments. In various embodiments, a pivoting lock assembly 250 may be coupled to hinge beam 220. Hinge beam 220 may be coupled an aircraft pylon. Translating sleeve 210 may be located adjacent to hinge beam 220. Translating sleeve 210 may be mounted to hinge beam 220. Translating sleeve 210 may be configured to translate forward (in the negative z-direction) and aft (in the positive z-direction). Translating sleeve 210 may be configured to translate forward to a stowed position. Translating sleeve 210 may be configured to translate aft to a deployed position.

Pivoting lock assembly 250 may comprise a housing 252. Housing 252 may be coupled to hinge beam 220. Housing 252 may comprise a housing flange 253. Housing flange 253 may comprise a plurality of apertures 251. Fasteners may be inserted into the plurality of apertures 251 to couple pivoting lock assembly 250 to hinge beam 220 in an installed position. A shaft 254 may be coupled to housing 252. A bar 256 may be coupled to shaft 254. Bar 256 may be referred to herein as a pivoting lock arm. In various embodiments, bar 256 may be configured to pivot about shaft 254, thus providing the pivoting action of the pivoting lock assembly. In various embodiments, bar 256 may be configured to rotate with shaft 254. Electric motor 262 may be coupled to housing 252. In various embodiments, electric motor 262 may be coupled to shaft 254. In various embodiments, electric motor 262 may be coupled to shaft 254 via a gear box. Electric motor 262 may be configured to rotate shaft 254. A spring 258 may be located between bar 256 and housing 252. In various embodiments, spring 258 may comprise a coil spring. In various embodiments, spring 258 may comprise a leaf spring. Spring 258 may be coupled to bar 256. Spring 258 may be coupled to housing 252. Spring 258 may be configured to bias the rotation of bar 256 about shaft 254. Translating sleeve 210 may comprise a ramp 212. In various embodiments, ramp 212 may be coupled to translating sleeve 210 via one or more fasteners. In various embodiments, ramp 212 may be integral to translating sleeve 210. Ramp 212 may be configured to interact with bar 256, as further described herein. A lever 260 may be coupled to shaft 254. Lever 260 may be configured to be rotated manually. Lever 260 may be configured to rotate shaft 254.

Figure 2B:
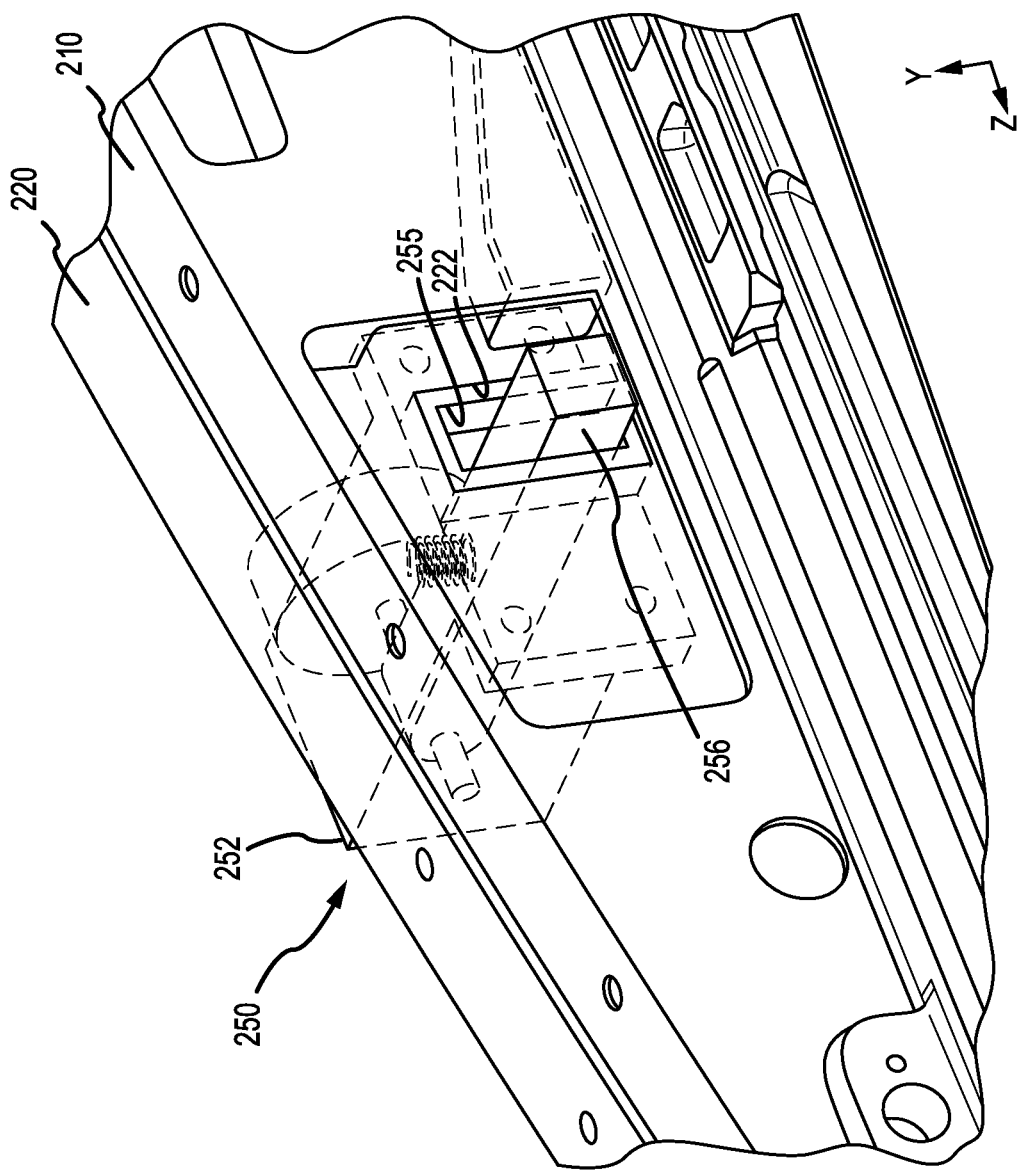
FIG. 2B illustrates a distal view of a pivoting track lock assembly in accordance with various embodiments.

Referring to FIG. 2B, a distal view of a hinge beam assembly is illustrated in accordance with various embodiments. Translating sleeve 210 is illustrated in a stowed position in FIG. 2B. Aperture 222 may be disposed on hinge beam 220. Aperture 255 may be disposed on housing 252. At least a portion of bar 256 may be located within aperture 255. At least a portion of bar 256 may be located within aperture 222 when pivoting lock assembly 250 is installed to hinge beam 220 as previously described.

Figure 3B:
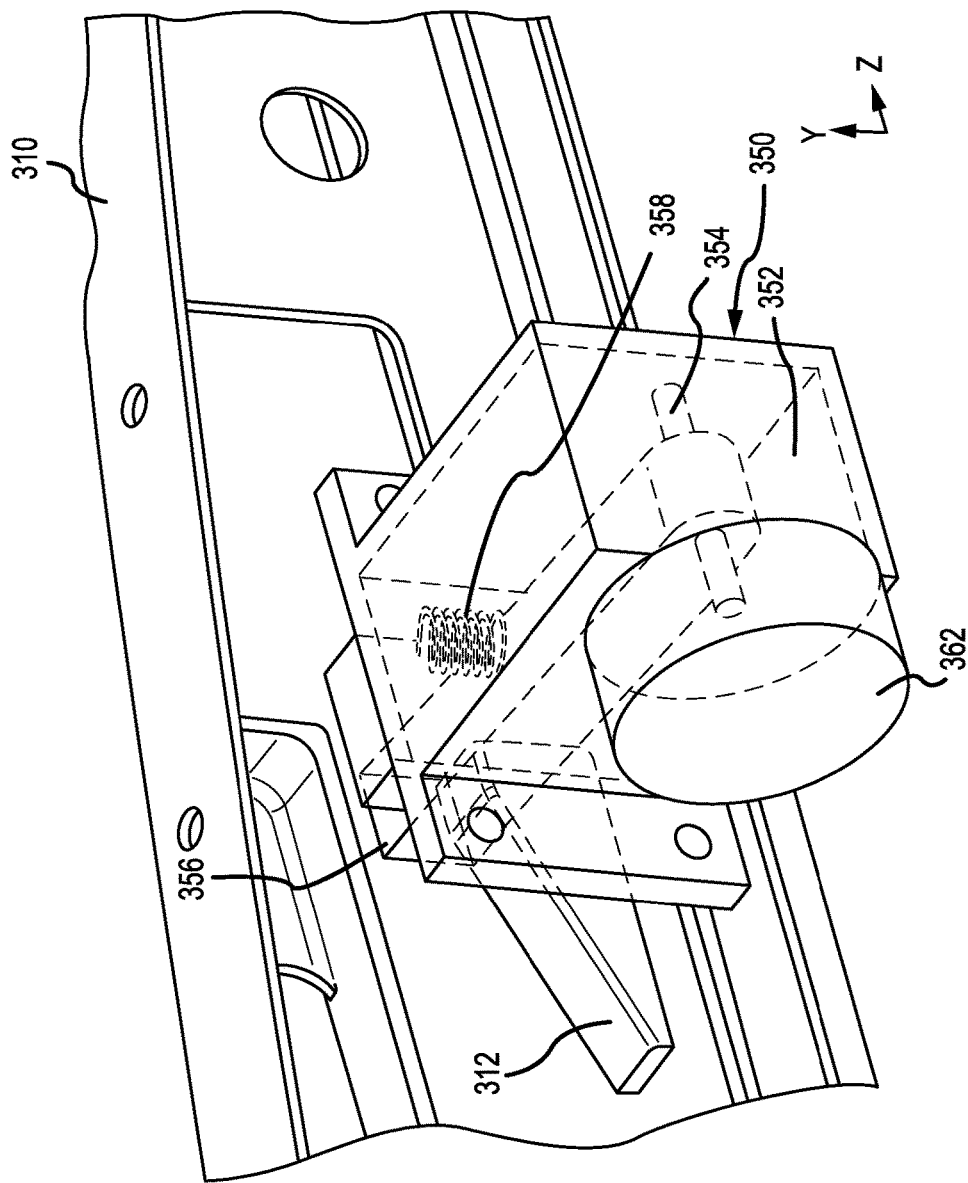
FIG. 3B illustrates a perspective view of a pivoting track lock assembly with the translating sleeve in a partially deployed position in accordance with various embodiments.

With respect to FIGS. 3A-3C elements with similar element numbering are intended to be the same and will not be repeated for the sake of clarity.

Referring to FIG. 3A, a perspective view of a translating sleeve assembly in a deployed position is illustrated in accordance with various embodiments. Although hinge beam 220 (FIG. 2A) is located between pivoting lock assembly 350 and translating sleeve 310 as previously described, hinge beam 220 (FIG. 2A) is not illustrated in FIG. 3A-FIG. 3C for clarity. At least a portion of ramp 312 may translate aft (in the z-direction) of bar 356 when translating sleeve 310 is in a deployed position. Spring 358 may bias bar 356 in the negative y direction, according to mechanical limitations when translating sleeve is in the deployed position.

Referring to FIG. 3B, a perspective view of a translating sleeve assembly in a partially deployed is illustrated in accordance with various embodiments. In various embodiments, as translating sleeve 310 translates from a deployed to a stowed position, translating sleeve 310 may translate in the forward direction (negative z-direction) which may cause ramp 312 to interact with bar 356. During interaction, bar 356 may rotate about shaft 354 in the positive y-direction as bar 356 slides up ramp 312. During this interaction, spring 358 may oppose the rotation of bar 356, becoming increasingly compressed, which may increase the potential energy of spring 358.

Referring to FIG. 3C, a perspective view of a translating sleeve assembly in a stowed position is illustrated in accordance with various embodiments. A portion of housing flange 353 is omitted for clarity. In various embodiments, ramp 312 may translate completely forward (in the negative z-direction) of bar 356. As previously described, the ramp 312 having translated completely forward of bar 356 may also be referred to as bar 356 having cleared ramp 312. Once ramp 312 translates completely forward of bar 356, the force of spring 358 may cause bar 356 to rotate in the negative y-direction to a locked (also referred to herein as closed) position, which may allow spring 358 to at least partially decompress. In various embodiments, ramp 312 may prohibit translating sleeve 310 from translating aft (in the positive z-direction) when translating sleeve 310 is in a stowed position. For example, if bar 356 is in a closed position, bar 356 may engage ramp 312 in the event that translating sleeve 310 begins translating aft, preventing ramp 312 from translating past bar 356 and consequently preventing translating sleeve from translating in the aft direction. In this manner, the forward surface of bar 356 may be configured to engage the aft surface 318 (with momentary reference to FIG. 3A) of ramp 312 when in a closed position, thereby preventing translating sleeve 310 from deploying. In various embodiments, the aft surface of ramp 312 may be referred to herein as a striker surface. In various embodiments, the forward surface of bar 356 may be configured to engage the aft surface of ramp 312 when in a closed position, thereby preventing translating sleeve 310 from deploying as previously described. In various embodiments, the forward surface of bar 356 may be configured to engage an aft surface of translating sleeve 310 when in a closed position, thereby preventing translating sleeve 310 from deploying. With momentary reference to FIG. 2B, in various embodiments, the forward surface of bar 356 may be configured to engage an aft surface of hinge beam 220 when in a closed position, thereby preventing translating sleeve 310 from deploying.

It may be desirable to translate translating sleeve 310 from a stowed position to a deployed position. In various embodiments, electric motor 362 may rotate bar 356 in the positive y-direction such that the distal (with respect to the axis of rotation of the bar) portion of bar 356 is rotated above (in the positive y-direction) ramp 312. Accordingly, electric motor 362 may rotate bar 356 until ramp 312 is no longer impeded by bar 356 during aft translation of ramp 312 (in the positive z direction). Bar 356 may be configured to rotate in a plane of rotation which may be normal to the direction of translation of translating sleeve 310.

In various embodiments, housing 352 may comprise aluminum. In various embodiments, bar 356 may comprise steel. In various embodiments, bar 356 may comprise titanium. In various embodiments, bar 356 may comprise aluminum. In various embodiments, bar 356 may comprise an austenitic nickel-chromium-based alloy such as Inconel®, which is available from Special Metals Corporation of New Hartford, N.Y., USA. In various embodiments, bar 356 may comprise a rectangular or I-beam geometry. In various embodiments, ramp 312 may comprise a metal such as steel or aluminum. In various embodiments, ramp 312 may be manufactured via a subtractive machining process.

In addition to housing 352 being coupled to hinge beam 220 (FIG. 2A) and ramp 312 being coupled to translating sleeve 310, housing 352 and ramp 312 may be located in inverse locations.

Figure 6B:
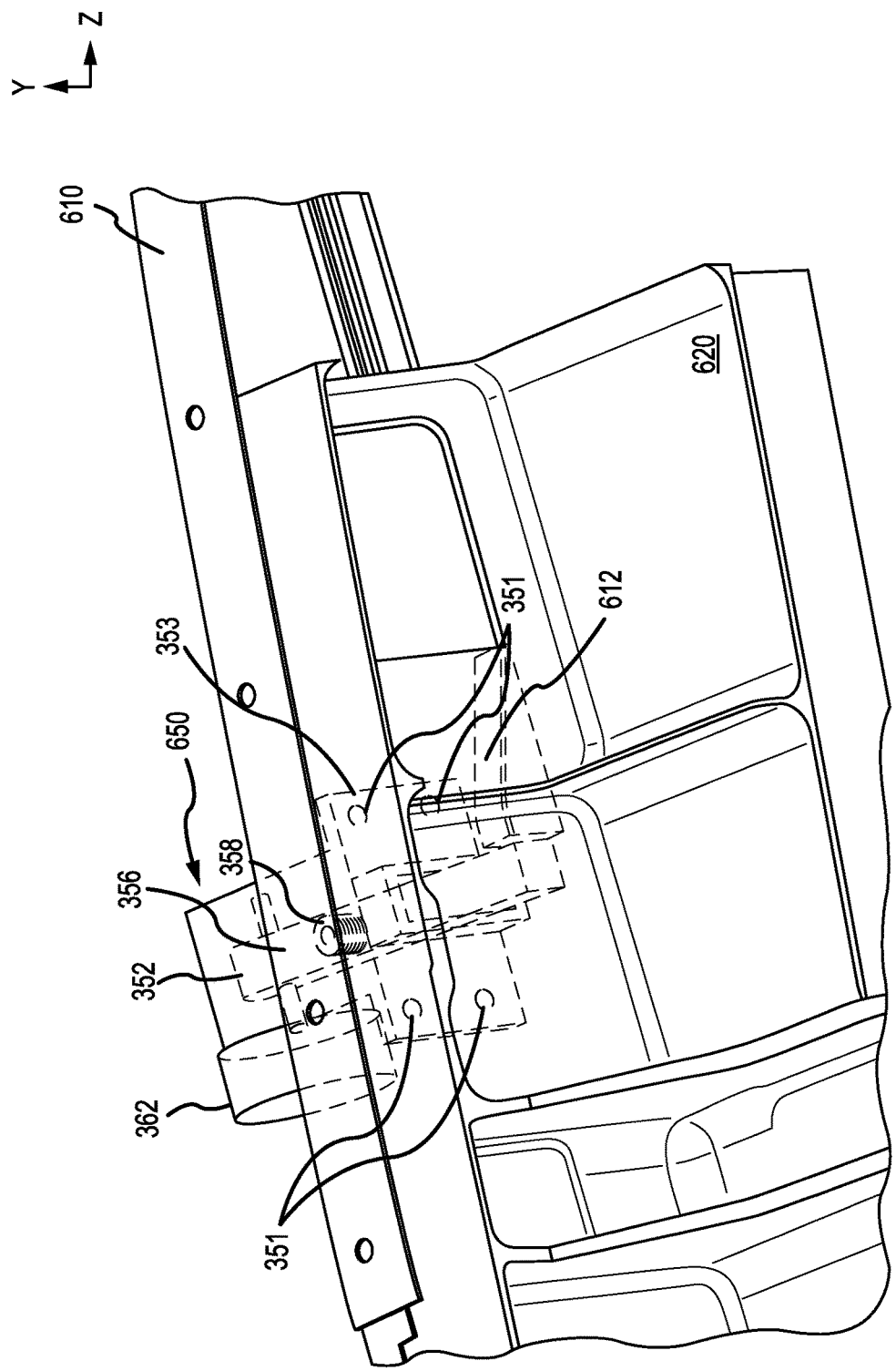
FIG. 6B illustrates a proximal view of a hinge beam assembly with the translating sleeve in a stowed position in accordance with various embodiments.

With respect to FIGS. 6A-6B elements with similar element numbering as illustrated in FIGS. 2A-3C are intended to be the same and will not be repeated for the sake of clarity.

Referring to FIG. 6A, a proximal view of a hinge beam assembly with the translating sleeve in a deployed position is illustrated in accordance with various embodiments. Hinge beam 620 may be coupled to an aircraft pylon. Translating sleeve 610 may be located adjacent to hinge beam 620. In various embodiments, a pivoting lock assembly 650 may be coupled to translating sleeve 610. Pivoting lock assembly 650 may be similar to pivoting lock assembly 250 according to FIG. 2A and FIG. 2B. Pivoting lock assembly 650 may be similar to pivoting lock assembly 350 according to FIG. 3A through FIG. 3C. Translating sleeve 610 may be configured to translate forward (in the negative z-direction) and aft (in the positive z-direction). Translating sleeve 610 may be configured to translate forward to a stowed position. Translating sleeve 610 may be configured to translate aft to a deployed position. Pivoting lock assembly 650 may comprise a housing 352. Housing 352 may be coupled to translating sleeve 610. Housing 352 may comprise a housing flange 353. Housing flange 353 may comprise a plurality of apertures 351. Fasteners may be inserted into the plurality of apertures 351 to couple pivoting lock assembly 650 to translating sleeve 610 in an installed position. Hinge beam 620 may comprise a ramp 612. In various embodiments, ramp 612 may be coupled to hinge beam 620 via one or more fasteners. In various embodiments, ramp 612 may be integral to hinge beam 620. Ramp 612 may be configured to interact with bar 656. Ramp 612 may be similar to ramp 312 of FIGS. 3A-3C.

Aperture 622 may be disposed on translating sleeve 610. At least a portion of bar 356 may be located within aperture 622 when pivoting lock assembly 650 is installed to translating sleeve 610 as previously described.

With further reference to FIG. 6B, a proximal view of a hinge beam assembly with the translating sleeve in a stowed position is illustrated in accordance with various embodiments. According to various embodiments, bar 356 may engage ramp when translating sleeve 610 is in the stowed position to prevent translating sleeve 610 from deploying as previously described.

Referring to FIG. 4A through FIG. 4D, a side view of exemplary coil spring locations for a pivoting track lock assembly is illustrated in accordance with various embodiments. Pivoting track lock assembly 400A illustrates the general pivoting lock assembly as previously described in FIG. 2A through FIG. 3D. Spring 458A may be located between shaft 454 and distal end 457 of bar 456 as illustrated in FIG. 4A. Spring 458A may be coupled to bar 456. Spring 458A may be coupled to housing 452. Spring 458A may apply a force to bar 456 which may cause bar 456 to rotate about shaft 454 in the direction of arrows 488. Accordingly, spring 458A may push on bar 456. Spring 458A may decompress in response to bar 456 rotating to a closed position as previously described. Likewise, spring 458A may compress in response to bar 456 rotating to an open position as previously described.

Pivoting track lock assembly 400B illustrates an exemplary pivoting lock assembly configuration. Spring 458B may be located between shaft 454 and proximal end 459 of bar 456 as illustrated in FIG. 4B. Spring 458B may be coupled to bar 456. Spring 458B may be coupled to housing 452. Spring 458B may apply a tension force to bar 456 which may cause bar 456 to rotate about shaft 454 in the direction of arrows 488. Accordingly, spring 458B may pull on bar 456. Spring 458B may extend in response to bar 456 rotating to an open position as previously described. Likewise, spring 458B may compress in response to bar 456 rotating to a closed position as previously described.

Pivoting track lock assembly 400C illustrates an exemplary pivoting lock assembly configuration. Spring 458C may be located between shaft 454 and distal end 457 of bar 456 as illustrated in FIG. 4C. Spring 458C may be coupled to bar 456. Spring 458C may be coupled to housing 452. Spring 458C may apply a tension force to bar 456 which may cause bar 456 to rotate about shaft 454 in the direction of arrows 488. Accordingly, spring 458C may pull on bar 456. Spring 458C may extend in response to bar 456 rotating to an open position as previously described. Likewise, spring 458C may compress in response to bar 456 rotating to a closed position as previously described.

Pivoting track lock assembly 400D illustrates an exemplary pivoting lock assembly configuration. Spring 458D may be located between shaft 454 and distal end 457 of bar 456 as illustrated in FIG. 4D. Spring 458D may be coupled to bar 456. Spring 458D may be coupled to housing 452. Spring 458D may apply a force to bar 456 which may cause bar 456 to rotate about shaft 454 in the direction of arrows 488. Accordingly, spring 458D may push on bar 456. Spring 458D may decompress in response to bar 456 rotating to a closed position as previously described. Likewise, spring 458A may compress in response to bar 456 rotating to an open position as previously described.

With respect to FIGS. 5A-5B elements with similar element numbering are intended to be the same and will not necessarily be repeated for the sake of clarity.

Referring to FIG. 5A, a side view of an exemplary pivoting track lock assembly with an actuator system 500 normal to the bar is illustrated in accordance with various embodiments. In various embodiments, actuator system 500 may comprise a hydraulic system. In various embodiments, actuator system 500 may comprise a pneumatic system. In various embodiments, actuator system 500 may comprise an electric system. Actuator system 500 may include an actuator housing 570, a piston 572-573, and a shaft 554. Actuator housing 570 may be coupled to housing 552 such that actuator housing 570 extends in a normal direction with respect to bar 556 when bar 556 is in the closed position. Fluid may be located within actuator housing 570. Piston 572 may extend, in response to mechanical pressure, from actuator housing 570 which may force bar 557 to rotate to an open position, as illustrated in FIG. 5A. Piston 572 may extend, in response to fluid pressure, from actuator housing 570 which may force bar 557 to rotate to an open position, as illustrated in FIG. 5A.

Referring to FIG. 5B, a side view of an exemplary pivoting track lock assembly with actuator system 500 at an angle to the bar is illustrated in accordance with various embodiments. In various embodiments, actuator system 500 of FIG. 5B may be similar to actuator system 500 of FIG. 5A. In various embodiments, actuator housing 570 may be coupled to housing 552 such that actuator housing 570 extends at an angle with respect to bar 556, when bar 556 is in the closed position, as illustrated in FIG. 5B.

While the pivoting lock systems described herein have been described in the context of aircraft applications, one will appreciate in light of the present disclosure that the system described herein may be used in connection with various other vehicles, for example, a launch vehicle, a spacecraft, an unmanned aerial vehicle, a missile, cars, trucks, busses, trains, boats, and submersible vehicles, or any other vehicle or device, or in connection with industrial processes, or propulsion systems, or any other system or process having different materials exposed to fluctuating temperatures.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A track lock assembly for a thrust reverser comprising:
   a translating sleeve;

a track beam adjacent the translating sleeve, the translating sleeve mounted on the track beam for translating movement relative thereto;

a lock assembly mounted to one of the translating sleeve or the track beam, wherein the lock assembly comprises a pivoting lock arm, the pivoting lock arm pivoting in a plane that is generally normal to the axis of translation of the translating sleeve;

a ramp mounted to the other of the translating sleeve or the track beam;

wherein the lock assembly is configured to secure the translating sleeve against translation relative to the track beam when the pivoting lock arm is in a locked position, wherein the pivoting lock arm is configured to engage the ramp; and wherein when the translating sleeve is deployed and moves toward its stowed position, the pivoting lock arm is pivoted by the ramp until the lock arm clears the ramp.

2. The track lock assembly of claim 1, wherein the lock assembly further comprises a shaft, a housing, and a spring, wherein the shaft is coupled to the housing, wherein the pivoting lock arm is configured to rotate with the shaft, and wherein the spring is coupled to the housing and the pivoting lock arm and configured to bias the pivoting lock arm to rotate with the shaft in a first direction.

3. The track lock assembly of claim 2, wherein in response to the translating sleeve translating from a deployed position to a stowed position, the pivoting lock arm is configured to interact with the ramp, the interaction causing the pivoting lock arm to rotate with the shaft in a direction opposite the first direction, wherein in response to the pivoting lock arm having cleared the ramp, the spring is configured to rotate the pivoting lock arm to a closed position.

4. The track lock assembly of claim 3, wherein the plane of rotation is normal to the direction of the translation.

5. The track lock assembly of claim 2, wherein the lock assembly further comprises an electric motor, wherein the electric motor is coupled to the shaft, wherein the electric motor is configured to rotate the pivoting lock arm from a closed position to an open position.

6. The track lock assembly of claim 2, wherein the lock assembly further comprises at least one of a hydraulic or pneumatic system, wherein the at least one of a hydraulic or pneumatic system comprises an actuator housing and a piston, wherein the piston is located at least partially within the actuator housing.

7. The track lock assembly of claim 6, wherein the piston is configured to protract from a cylinder, wherein in response to the protraction, the piston is configured to rotate the pivoting lock arm from a closed position to an open position.

8. The track lock assembly of claim 2, wherein the housing comprises aluminum.

9. The track lock assembly of claim 2, wherein at least one of the pivoting lock arm and the ramp comprises at least one of steel or aluminum.

10. A nacelle comprising:
a translating sleeve;
a track beam adjacent the translating sleeve, the translating sleeve mounted on the track beam for translating movement relative thereto;
a lock assembly mounted to one of the translating sleeve or the track beam, wherein the lock assembly comprises a pivoting lock arm, the pivoting lock arm pivoting in a plane that is generally normal to the axis of translation of the translating sleeve;
a ramp mounted to the other of the translating sleeve or the track beam;
wherein the lock assembly is configured to secure the translating sleeve against translation relative to the track beam when the pivoting lock arm is in a locked position, wherein the pivoting lock arm is configured to engage the ramp; and
wherein when the translating sleeve is deployed and moves toward its stowed position, the pivoting lock arm is pivoted by the ramp until the lock arm clears the ramp.

11. The nacelle of claim 10, wherein the lock assembly further comprises a shaft, a housing, and a spring, wherein the shaft is coupled to the housing, wherein the pivoting lock arm is configured to rotate with the shaft and wherein the spring is coupled to the housing and the pivoting lock arm and configured to bias the pivoting lock arm to rotate with the shaft in a first direction.

12. The nacelle of claim 11, wherein in response to the translating sleeve translating from a deployed position to a stowed position, the pivoting lock arm is configured to interact with the ramp, the interaction causing the pivoting lock arm to rotate with the shaft, wherein the spring is configured to oppose the rotation, wherein in response to the pivoting lock arm having cleared the ramp, the spring is configured to rotate the pivoting lock arm to a closed position.

13. The nacelle of claim 12, wherein the plane of rotation is normal to the direction of the translation.

14. The nacelle of claim 11, wherein the pivoting lock assembly further comprises an electric motor, wherein the electric motor is coupled to a pivot, wherein the electric motor is configured to rotate the pivoting lock arm from a closed position to an open position.

15. The nacelle of claim 11, wherein the pivoting lock assembly further comprises one of a hydraulic, pneumatic, or electric system, wherein the one of a hydraulic, pneumatic, or electric system comprises an actuator housing and a piston, wherein the piston is located at least partially within the actuator housing, wherein the piston is configured to protract from a cylinder, wherein in response to the protraction, the piston is configured to rotate the pivoting lock arm from a closed position to an open position.

* * * * *